United States Patent [19]

Froelich

[11] Patent Number: 4,983,036

[45] Date of Patent: Jan. 8, 1991

[54] SECURE IDENTIFICATION SYSTEM

[76] Inventor: Ronald W. Froelich, 2405 N. Cameron Ave., Covina, Calif. 91724

[21] Appl. No.: 286,214

[22] Filed: Dec. 19, 1988

[51] Int. Cl.$^5$ .............................................. G06K 9/20
[52] U.S. Cl. .......................................... 356/71; 382/4
[58] Field of Search ............................... 356/71; 382/4

[56] References Cited

U.S. PATENT DOCUMENTS 2,964,641  12/1960  Selgin ..................................... 356/71
4,414,684  11/1983  Blonder ................................. 356/71
4,690,554   9/1987  Froelich ................................ 356/71

Primary Examiner—Richard A. Rosenberger
Attorney, Agent, or Firm—Saul Epstein

[57] ABSTRACT

An identification system including an exemplar fingerprint on an identification card which is to be compared using autocorrelation with a fingerprint of the presenter of the card. Additionally, waveforms generated during the autocorrelation step are compared with similar waveforms taken at the time the card is issued and recorded in a read only memory within the card. This latter comparison assures that the exemplar has not been tampered with.

18 Claims, 3 Drawing Sheets

SECURE IDENTIFICATION SYSTEM

BACKGROUND OF THE INVENTION

1. Field of the Invention

This invention relates to systems for assuring that a person presenting him or herself as a particular person is, in fact, that person.

2. Prior Art

As technology has developed over the years, the need to quickly identify persons with certainty for purposes of access control and for various commercial transactions such as the extension of credit and banking has become of critical importance. For example, so called "smart" credit cards are coming into use and there is substantial risk of large financial losses to the owner of such a card if it falls into the wrong hands without a way of checking the identity of the possessor. "Smart" credit cards may include the facility for maintaining complete records of an individual's bank balance and his or her transactions so that a merchant accepting such a card need not confirm a balance with the issuing bank, but can extend credit based on the record contained within the credit card itself. If, however, the presenter of the card is not the actual owner of the card, as, for example, if the card is stolen, credit should not be extended. It is therefore desirable, and in some cases essential, that there be a means for positively and quickly identifying the card presenter as being the actual person he or she purports to be.

Positive identification is also important in other contexts. Credit type cards with machine readable codes are commonly used to control access to restricted areas. For this purpose it is often essential that positive identification of the presenter be quickly made else unauthorized persons may be granted access to highly classified information. There are innumerable other examples of situations where an individual's identity must be quickly and positively established.

Photographs and fingerprints are very common means of identification. Driver's licenses, for example, often contain one or both of the owner's photograph and a fingerprint. These means of identification are not very secure, however, since it is relatively easy for skilled forgers to alter such identification and thus provide an imposter with apparently legitimate identification.

The present invention is concerned with providing a means for identification which cannot be altered so that when the item, such as a credit card or access card, is presented, the recipient can be assured that the presenter is who he or she claims to be.

SUMMARY OF THE INVENTION

In a patent previously issued to me, U.S. Pat. No. 4,690,554 (the '554 patent), I described a device employing optical autocorrelation to automatically and quickly compare the fingerprint of an individual with a previously obtained exemplar. In the system described in the '554 patent, a fingerprint of the presenter obtained at the time of presentation (a "test" print) is illuminated, and an image thereof focused on an exemplar print which is on the identification card presented. The light reflected off the exemplar is directed to a photodetector which detects the total light reflected off the exemplar. An optical system which includes rotating mirrors causes the image of the test print to move with respect to the exemplar in raster fashion, i.e., the exemplar is scanned by the image of the test print, the image of the test print moving across the exemplar in a series of straight lines, each being displaced by a small amount. If the presenter's fingerprint is not the same as that of the exemplar, the output of the photodetector will be relatively constant but will vary in a random manner. Similarly, if the two prints are the same, but the image of the presenter's fingerprint is not aligned with the exemplar, a relatively constant but randomly varying output will be obtained from the photodetector. However, in the course of the raster scan of the image of the test print over the exemplar when the prints are the same, at some point there will be alignment of the image and the exemplar. When this occurs, the light reflected off the exemplar will suddenly increase or decrease resulting in a sudden large change in output from the photodetector. Such a sudden change in output from the photodetector is taken to indicate a "match", i.e., that the presenter is the person whose fingerprint appears on the identification card.

The system described in the '554 patent is very useful for making rapid identifications in situations where only moderate security is required. For very high security situations, it can be seen that the '554 patent has limitations. For example, a clever forger could conceivably replace the exemplar on a card with an exemplar print from an imposter. The system of the '554 patent has no way of detecting forged exemplars.

In the system of the present invention, however, the exemplar cannot be forged. The presently preferred embodiment of the present invention involves using the autocorrelation comparison system described in the '554 patent to compare a test print with an exemplar to achieve a "match", but additionally includes a checking system which assures that the exemplar has not been altered.

This checking is possible since in addition to the single large peak in photodetector output which occurs at the precise time of match between the test fingerprint and the exemplar, I have discovered that as match approaches, the photodetector output takes on a character which is more regular than the random "noise" type of signal which is typical when the scan is far from match. In fact, the signal is so regular on the scan line which includes the match that it could be used as an indication of match even without using the peak which occurs at exact match. In the present invention, a representation of the photodetector output which will occur during the scan line including an exact match is recorded in a read only memory located within the identification card and is compared to the actual photodetector output obtained when a match is found. If there is substantial correspondence between the stored signal and the photodetector output, the match is confirmed.

Since the recorded representation is in a read only memory, within the identification card, it cannot be altered to correspond to any bogus exemplar which might be provided by a forger.

DETAILED DESCRIPTION OF THE PREFERRED EMBODIMENT

The identification card used in the invented system is preferably similar to an ordinary credit card in size and shape. That is, it is preferably about 54 by 85 mm in size and about 0.8 mm thick. Depending upon the particular use to which the card is to be put, it may contain microminiature electronic subsystems for recording banking transactions or other information as necessary to enable the card to perform a desired function. Separate and apart from such subsystems, except for the possible commonality of some components such as power source and input/output ports, is a verification subsystem which is used to verify that the card has not been altered.

Figure 1:
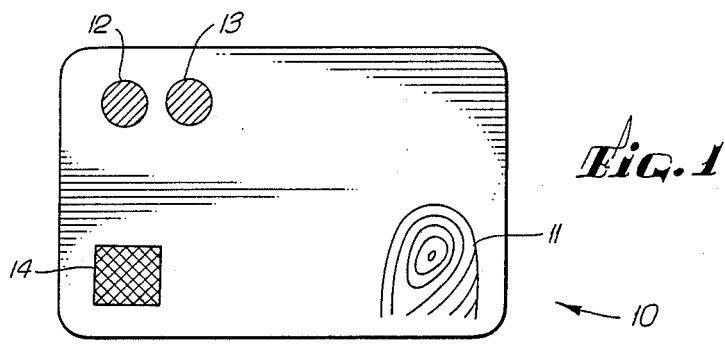
FIG. 1 is a plan view of an identification card as used in the presently preferred embodiment of the invention.

FIG. 1 shows a typical identification card 10 as could be used in connection with the present invention. An exemplar fingerprint of the owner of the card 11 is placed on the card at the time of issue. The card also includes data input and output ports 12 and 13 as well a power input port 14. The data input/output ports may be coupled to external read/write apparatus using optical, magnetic, electrical contacts or other coupling means. Similarly, power may be supplied through conventional coupling means. Alternatively, power may be provided by self contained batteries.

Figure 2:
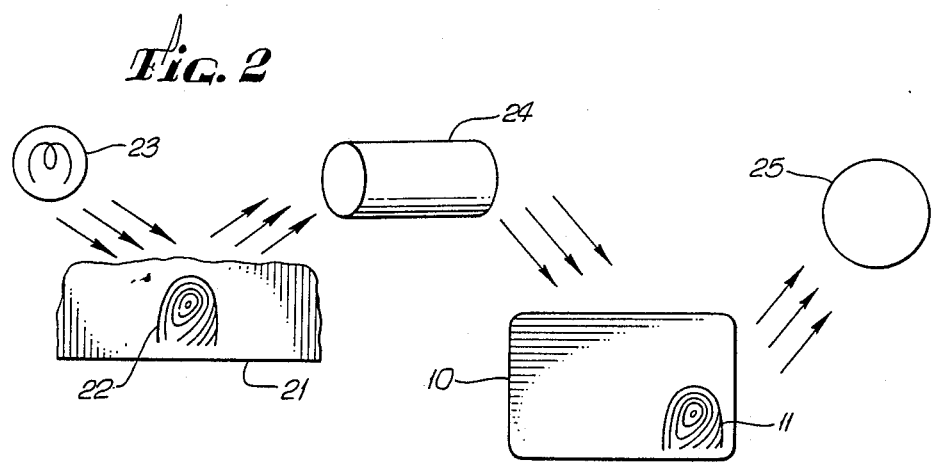
FIG. 2 is a schematic representation of the optical scanning portion of the system
Figure 3:
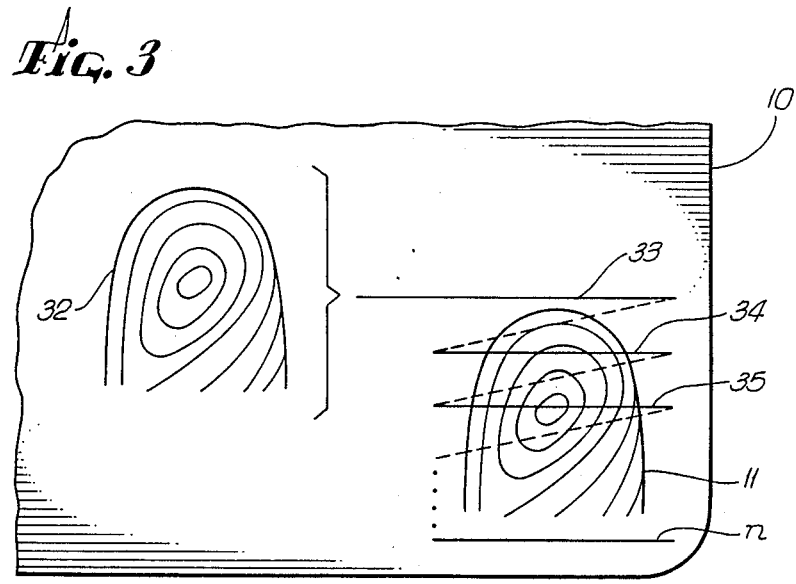
FIG. 3 is an enlarged section of the card of FIG. 1 showing how an image of a fingerprint is scanned over the exemplar on the card.
Figure 4:
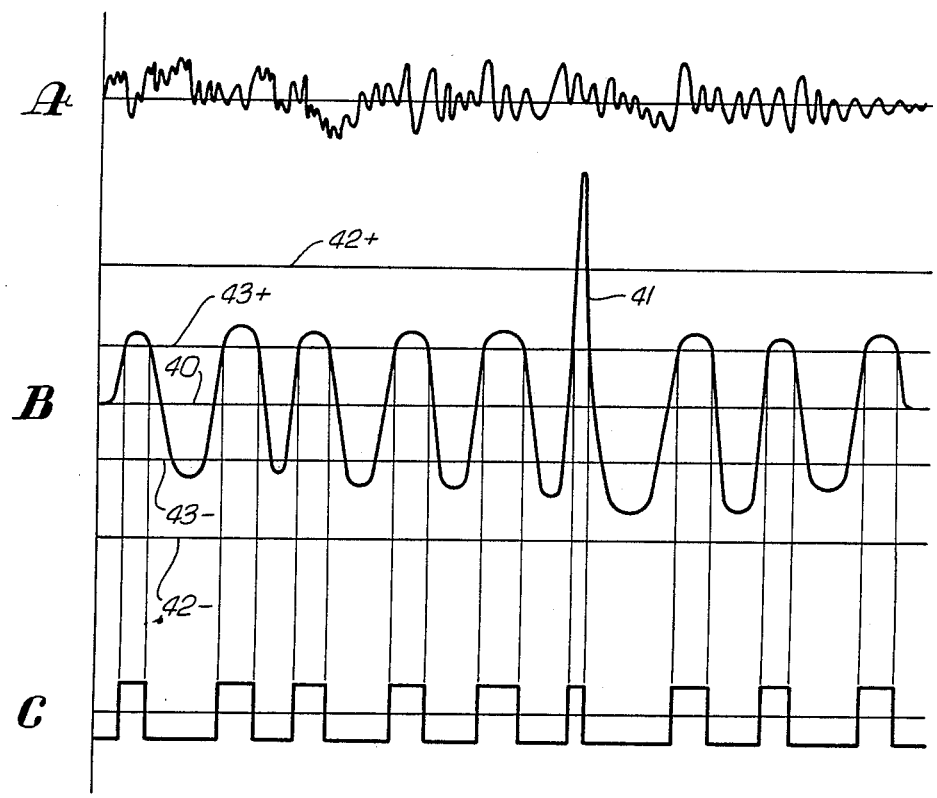
FIG. 4 depicts waveforms which occur during operation of the invention.

When the card is presented to identify the bearer it is placed in a card reader which optically scans and compares the exemplar on the card with a fingerprint of the presenter (the test print). Details of a presently preferred embodiment of card reader used in connection with the present invention can be found by reference to my previously issued patent, U.S. Pat. No. 4,690,554 (the '554 patent). FIG. 2 depicts, in a highly schematic way, the optical scanning system disclosed in the '554 patent. As shown in FIG. 2, a treated paper carrier 21 is provided, on which a fingerprint 22 (the test print) of the person presenting identification card 10 is impressed. Means for making sharp, high contrast prints on treated paper are well known in the art and need not be described in detail. A lamp 23 illuminates the test print 22 and light reflected therefrom is passed through a scanning optical system 24 which focuses an image 32 (FIG. 3) of the test print 22 on card 10 in the vicinity of exemplar 11. Light reflected off card 10 is detected by photodetector 25. The scanning optical system 24 includes appropriate lenses and rotating mirrors to cause the image 32 of the test print 22 to move rasterwise with respect to the exemplar print 11. The raster scan lines 33, 34, 35, ... n are shown widely spaced in FIG. 3 for purposes of clarity. In actuality, the raster scan lines are closely spaced so as to assure that on one of the scans substantially all of the features of the test print will coincide with the corresponding features of the exemplar, if the prints are from the same person. As the image 32 scans across the exemplar 11, when no match is imminent the reflected light reaching photodetector 25 is relatively constant, but varies somewhat in a random manner as shown in FIG. 4A. The signal appears to be simply "noise". As a match between the image 32 and exemplar 11 approaches, however, the reflected light variation tends to increase and to have a definite cyclical and repeatable character. On the scan line which includes an exact match between image 32 and exemplar 11, the reflected light has been found to have a remarkably repeatable character and to include a large peak which corresponds to the match condition. The output of photodetector 25 during a typical scan which includes an exact match is shown in FIG. 4B. The baseline 40 corresponds to some average amount of light reflected to photodetector 25 during the scan. As can be seen, there is a single large peak 41 in photodetector output during the scan. This peak corresponds to a coincidence between the image of the test print (32) and the exemplar. It has been found that this peak can either be positive or negative. That is, the peak can represent a large increase in light which occurs when the test print image precisely overlays the exemplar, or the peak can represent a large reduction in light which can occur when the dark areas of the test print coincide with the light areas of the exemplar. The peak 41 shown in FIG. 4B is of the positive variety. Thresholds 42+ and 42− are set so as to enable detection of the peak 41, whether positive or negative, indicating the match condition.

Figure 5:
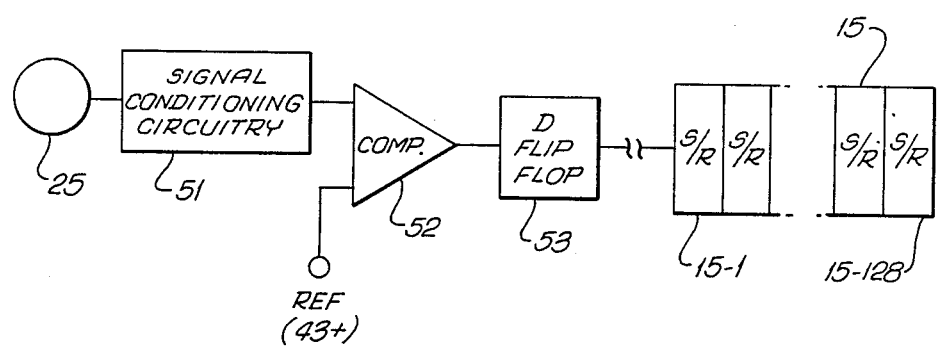
FIG. 5 is a block diagram of the circuit used to record data in the identification card.

The voltage output from photodetector 25 during the scan which includes peak 41 has a unique character which depends on the configuration of the prints being compared. FIG. 5 is a schematic block diagram of a circuit which can be used to quantify and record certain characteristics of this voltage at the time the identification card is issued, for later comparison. When an identification card 10 is prepared, the person who is to be the owner of the card has an exemplar of his or her fingerprint placed on the card as previously described. The card is then placed in a card reader such as described in the '554 patent and the person provides a second print 22 on a carrier sheet 21 also as previously described. During the scan of the print 11 by an image of print 22, the output of photodetector 25, is coupled through suitable signal conditioning circuitry, 51 is to a comparator 52. The comparator is also provided with a reference voltage 43+which is set at some voltage lower than the peaks of the voltage waves seen in FIG. 4B but preferably high enough to avoid detecting the noise voltage present when a match is not imminent. The output of comparator 52 is fed to a D type flip flop 53. Flip flop 53 is preferably clocked at a rate which will provide about 128 clock pulses during one scan of image 32 over exemplar 11. The output of flip flop 53 is fed through input port 12 of card 10 to a 128 cell shift register located in the card. On the scan which includes an exact match between the image of print 22 and exemplar 11 the output of flip flop 53 appears as shown in FIG. 4C. The signal is high during the times that the output of photodetector 25 is greater than reference voltage 43+, shifted slightly in accordance with the clock signals. When the output of photodetector 25 is lower than the reference voltage 43+, the output of flip flop 53 is low. A microprocessor, not shown, controls the transfer of signals to shift register 15. When shift register 15 is filled with the signals corresponding to the exact match it is uncoupled and the shift register then contains a representation of the waveform which accompanies an exact match. The input to shift register 15 is then permanently disconnected as by a fusible link, or otherwise, so that its contents can no longer be altered.

Figure 6:
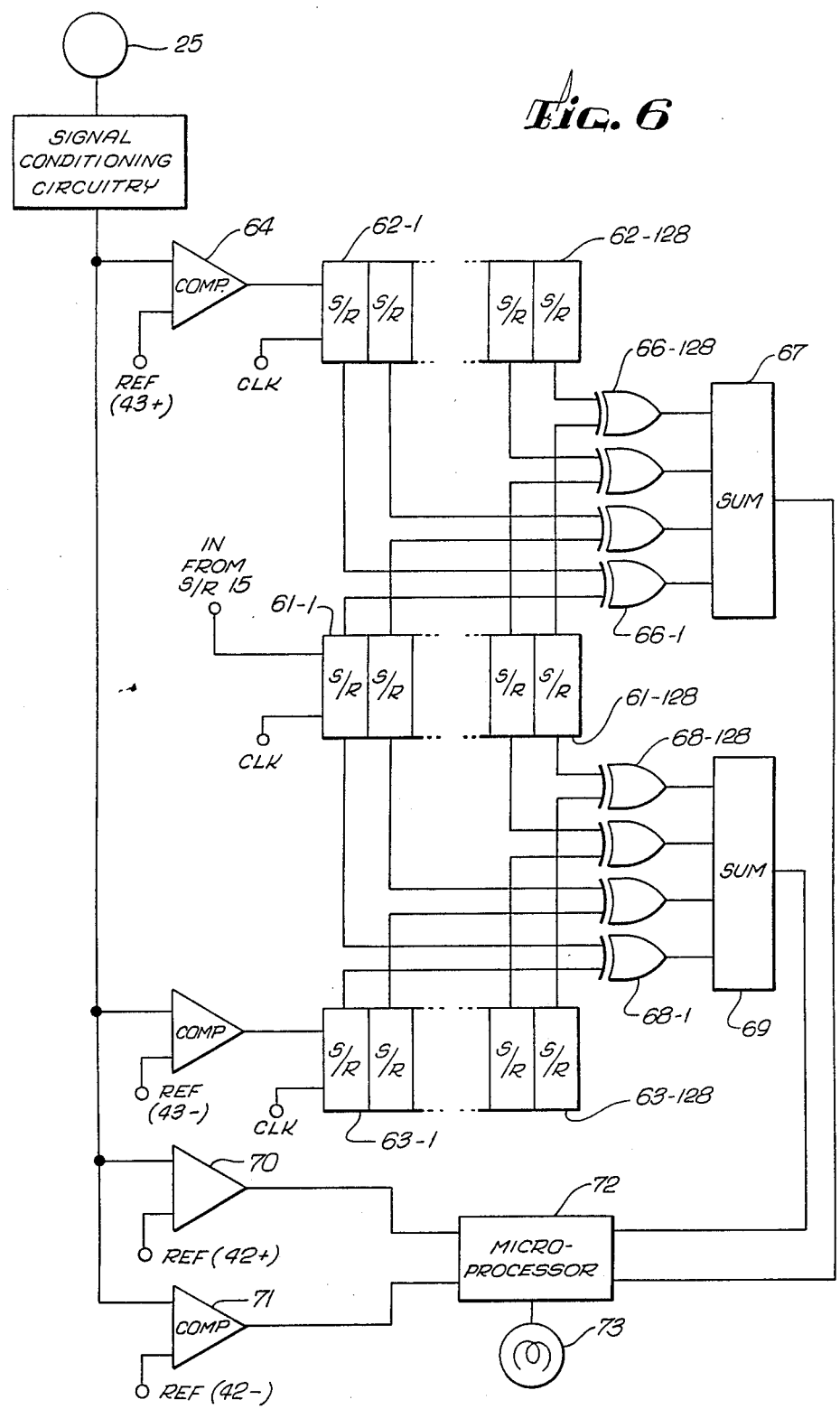
FIG. 6 is a block diagram of the print comparison circuit.

When the identification card is later presented for identification purposes, the contents of shift register 15 is compared to a signal (derived in a similar way) to assure that not only does the presenter's fingerprint match the exemplar on the card, but that it matches the 128 bit representation in shift register 15. FIG. 6 is a block diagram of the circuitry used to perform this comparison at the time of presentation.

The presented identification card is inserted in a card reader as described in the '554 patent and a fingerprint of the presenter taken as previously described. Prior to scanning the exemplar on the card with an image of the presenter's fingerprint, the contents of the 128 bit shift register 15 in card 10 is read out through output port 13 and stored in shift register 61 located in the card reader. As can be seen in FIG. 6, the output of photodetector 25 is coupled to shift registers 62 and 63 through appropriate signal conditioning stages and comparators 64 and 65. The signals obtained from photodetector 25 during scans of exemplar 11 will be similar to that shown in FIGS. 4A and 4B.

Comparator 64 is connected to a reference voltage having the same relative amplitude as threshold 43+ while comparator 65 is connected to a reference voltage 43— which is as much less than the voltage at baseline 40 as voltage 43+ is above. During the portions of the scan where a match is not imminent, because the photodetector 25 output is relatively low level noise, very little gets past comparators 64 and 65, and the contents of shift registers 62 and 63 are mostly zeros, but in any event the contents are random. On the other hand, on the scan which includes a match, it can be seen that the signals coupled to shift register 62 will theoretically be identical to the signals coupled to shift register 15 at the time the card was originally made. This implies that at the end of the scan which includes an exact match, the contents of shift register 62 will be identical to the contents of shift register 61. While complete identity as a practical matter is unlikely, as a practical matter there will be a relatively high percentage of the shift register stages of shift register 62 which are in the same state as the corresponding stages of shift register 61. The output of summing circuit 67, which in effect totals the number of exclusive OR gates 66-1 through 66-128 sensing the same condition in corresponding shift register stages of shift registers 61 and 62, gives a measure of the similarity of the waveform of FIG. 4B as represented by the state of shift register 15 compared to the subsequently generated waveform represented by the state of shift register 62. A relatively high correspondence, i.e., a relatively high output from summing circuit 67 indicates that the print 22 is very likely to be of the same person whose print was taken at the time of issuance of the card. The foregoing statement is qualified since only a limited amount of information is contained in the shift register 15. Hence the information obtained from this source alone is not sufficient to absolutely identify the presenter. When used in conjunction with a match between image 32 and exemplar 11, however, the output from summing circuit 67 can be used to assure that the exemplar has not been altered and thus the entire system can provide an absolute identification. For less secure systems, the output from summing circuit 67 would provide a satisfactory identification means.

It has been found that the shift register match just described is sometimes better when the negative going peaks of the signal shown in FIG. 4B are compared with the contents of shift register 15 rather than the positive going peaks as described. Consequently, in the presently preferred embodiment of the invention, a second comparison channel comprising comparator 65, shift register 63, exclusive OR gates 68-1 through 68-128, and summing circuit 69 is provided. This channel operates in the same manner as described above except that the input data is referenced to threshold 43— instead of 43+. A high output from either summing circuit, 67 or 69, is taken as a match.

As mentioned previously, during the scan where an exact match between image 32 and exemplar 11 takes place, a large photodetector output occurs, which output can be either positive or negative. The occurrence of such an output is detected by comparators 70 or 71 which are referenced to threshold voltages 42+ and 42— respectively. The outputs of comparators 70 and 71, as well as the outputs of summing circuits 67 and 69 are fed to microprocessor 72 which, upon detection of a pulse from comparator 70 or 71 together with a high output from either summing circuit 67 or 69, causes lamp 73 to be lit. Lamp 73 indicates that the identification test has been passed, namely that the person presenting the identification card is the same person to which the card was issued.

What has been described is a secure identification card system which not only compares the fingerprint of a presenter with an exemplar print on the card, but assures hat the exemplar print on the card has not been tampered with. If, for example, the exemplar has been changed to correspond to the fingerprint of an imposter, at the time of match between the image of the imposter's print and the exemplar comparator 70 or 71 will indicate that fact, but summing circuits 67 and 69 will not have the necessary high output to cause microprocessor 72 to light lamp 73.

An additional precaution could be taken to preclude the possibility of a forger making up an entirely bogus identification card rather than simply trying to alter an existing card. This possibility can be prevented by storing a 128 bit number representing the state of shift register 15 in a central bank computer. At the time of presentation, a third match would then be required before the presenter is recognised as legitimate. The third match would be a comparison of the contents of shift register 15 with the 128 bit number stored in the central computer.

Although I have described my invention in terms of a preferred embodiment and also disclosed several alternative features, the invention should not be construed to be so limited. This disclosure is to be regarded as illustrative rather than restrictive. It is my intention that any and all variations in the examples which I have chosen for purposes of explanation which come within the spirit and scope of the following claims are to be included as part of the invention.

I claim:

1. A system for identification of a person which comprises:
   (a) a document bearing an exemplar body part print of a known person;
   (b) means for projecting an optical image of a corresponding body part print of a person to be identified on said exemplar;
   (c) means for moving said image with respect to said exemplar whereby during said motion the features of said image will come into coincidence with the corresponding features of said exemplar if said person to be identified is said known person;
   (d) means for sensing the light reflected from said exemplar during said motion; and (e) means for comparing the pattern of the variations in the amounts of light reflected from said exemplar during a portion of said motion with a previously determined pattern, said portion including a region where the features of said image and said exemplar are not in coincidence.

2. A system as recited in claim 1 wherein said previously determined pattern is represented by the states of shift register cells.

3. A system as recited in claim 2 wherein said shift register cells are attached to said document.

4. A system as recited in claim 2 and further including means for sensing at predetermined intervals whether said light reflected from said exemplar during said motion is greater or less than a predetermined level.

5. A system as recited in claim 1 and further including means for sensing the coincidence of the features of said image with the corresponding features of said exemplar.

6. A system as recited in claim 5 wherein said previously determined pattern is represented by the states of the cells of a shift register.

7. A system as recited in claim 1 where said image is moved in raster fashion with respect to said exemplar.

8. A system as recited in claim 7 wherein said comparisons of the pattern is reflected light are made during the motion of said image along one line of said raster, said line being the one which includes coincidence of the features of said image with the corresponding features of said exemplar.

9. A system for comparing patterns which comprises:
(a) a first image of a first pattern;
(b) means for creating a combined image comprising said first image and a second image superposed, said second image being an image of a second pattern;
(c) means for causing relative motion between said first and second images in said combined image whereby if said first and second patterns are identical, the features of said first and second images will come into substantial coincidence during said relative motion;
(d) means for generating a signal responsive to the extent of correspondence between the features of said first and second images in said combined image; and
(e) means for comparing the pattern of said signal during said motion with a previously established pattern, including during a portion of said motion when said first and second images are not in substantial coincidence, .

10. A system as recited in claim 9 where said comparing means includes means for sensing at predetermined intervals during said relative motion whether said signal is greater or less than a predetermined magnitude.

11. A system as recited in claim 9 where said relative motion is in raster fashion.

12. A system as recited in claim 11 wherein comparisons are made during the motion along the line of said raster which includes the substantial coincidence of the features of said first image with the corresponding features of said second image.

13. A system for identification of a person which comprises:
(a) a first image of spatially related features unique to a known person;
(b) means for creating a combined image comprising said first image superposed on a second image, said second image being an image of corresponding spatially related features of a person to be identified
(c) means for causing relative motion between said second image and said first image whereby during said motion, if said images are substantially identical, the spatially related features of said first image and said second image will come into substantial coincidence in said combined image;
(d) means for generating a signal responsive to the extent of correspondence between the features of said first image and said second image in said combined image; and
(e) means for comparing the pattern of said signal occurring during a portion of said motion with a previously established pattern, said portion including a region of said motion where said images are not in substantial coincidence 14. A system as recited in claim 13 where said comparing means includes means for sensing whether said signal is greater or less than a predetermined magnitude.

15. A system as recited in claim 13 wherein said previously established pattern is represented by the states of shift register cells.

16. A system as recited in claim 13 and further including means for sensing the substantial coincidence in said combined image of the features of said first image with the corresponding features of said second image.

17. A system as recited in claim 13 where said relative motion is in raster fashion.

18. A system as recited in claim 17 wherein comparisons are made during the motion along the line of said raster which includes the substantial coincidence of the features of said first image with the corresponding features of said second image.

* * * * *